United States Patent [19]
Allen

[11] Patent Number: 6,019,433
[45] Date of Patent: Feb. 1, 2000

[54] CONCRETE SAW WITH STABILIZED CARRIAGE AND BLADE CONTROL

[75] Inventor: J. Dewayne Allen, Paragould, Ark.

[73] Assignee: Allen Engineering Corporation, Paragould, Ark.

[21] Appl. No.: 08/958,703

[22] Filed: Oct. 24, 1997

[51] Int. Cl.[7] .................................. B28D 1/04; B26D 3/06
[52] U.S. Cl. ........................................ 299/39.3; 125/13.01
[58] Field of Search ................................ 125/13.01, 14; 172/13, 14, 15, 42; 299/39.3, 39.1

[56] References Cited

U.S. PATENT DOCUMENTS

| | | | |
|---|---|---|---|
| D. 404,042 | 1/1999 | Allen | D15/127 |
| 1,736,538 | 11/1929 | Kurtz | 299/27 |
| 2,468,336 | 4/1949 | Lewis | 299/39.3 |
| 2,673,725 | 3/1954 | Coates | 299/39.3 |
| 2,700,256 | 1/1955 | Lewis | 299/39.3 |
| 3,357,745 | 12/1967 | Cooper | 299/39.3 |
| 3,587,749 | 6/1971 | Sauer | 172/15 |
| 3,593,802 | 7/1971 | Lange, Jr. | 172/15 |
| 3,656,468 | 4/1972 | Welden | 125/13.01 |
| 3,663,060 | 5/1972 | Shatwell et al. | 299/39.3 |
| 3,747,981 | 7/1973 | Zuzelo | 299/39.3 |
| 3,778,110 | 12/1973 | Staab | 299/39.5 |
| 3,779,607 | 12/1973 | Staab | 299/39.4 |
| 4,145,086 | 3/1979 | Ishihara | 299/15 |
| 4,188,934 | 2/1980 | Reinhardt et al. | 125/4 |
| 4,769,201 | 9/1988 | Chiuminatta et al. | 264/154 |
| 4,840,431 | 6/1989 | Jedick | 299/39.3 |
| 4,889,675 | 12/1989 | Chiuminatta et al. | 264/154 |
| 4,928,662 | 5/1990 | Chiuminatta et al. | 125/13.01 |
| 4,938,201 | 7/1990 | Chiuminatta et al. | 125/13.01 |
| 5,056,499 | 10/1991 | Chiuminatta et al. | 125/14 |
| 5,086,750 | 2/1992 | Chiuminatta et al. | 125/13.01 |

OTHER PUBLICATIONS

Soff–Cut International 03346/SOF (1993) Buyline 7354.
"Protest Under MPEP 1900" Submitted Nov. 22, 1995 Re Applicant: Edward Zuzelo Title: Green Concrete Cutting Saw.
Razorback GM–150 Concrete Saw Brochure Allen Engineering Corporation (1994).
Razorback GM–150 Concrete Saw Operation & (1994) Maintenance Manual—Allen Engineering Corp.
Razorback GM–400 "Green Concrete Saw" Brochure Allen Engineering Corp. (Undated).
Razorback GM–400 Concrete Saw Operation & (1995) Maintenance Manual—Allen Engineering Corp.

*Primary Examiner*—William Neuder
*Assistant Examiner*—John Kreck
*Attorney, Agent, or Firm*—Stephen D. Carver

[57] ABSTRACT

A highly stable concrete saw for cutting crack control relief grooves features a stabilized and reinforced carriage. The carriage frame comprises a generally C-shaped, rigid metal weldment having a closed side extending between a closed front and closed rear. The opposite side is partially open at the bottom, but closed at the top by an elevated reinforcing bridge that connects the front and rear of the frame. The frame substantially surrounds and pivotally captivates a rigid subframe supporting the drive motor and the blade assembly. The carriage comprises a pair of rigid, inwardly offset and downwardly projecting tabs at its front and rear. The tabs are line bored to journal elongated axles that mount front and rear pairs of resilient rollers. Angled scraper assemblies projecting downwardly in front of each pair of rollers deflect away loose debris to maintain a smooth travel path for the carriage. A belt driven axle terminating in an arbor disposed at the open side of the frame supports a rotary cutting blade. The blade is shrouded by a pivotally displaceable guard that mounts a forwardly projecting roller wheel that is normally firmly biased against the concrete surface. Saw alignment is aided with a deflectable pointer that normally follows the intended cutting path. A controlling handle assembly projects from the carriage rear for saw control. A handle-mounted control cable extends to the motor for pivoting the subframe to adjust blade cutting depth.

11 Claims, 7 Drawing Sheets

CONCRETE SAW WITH STABILIZED CARRIAGE AND BLADE CONTROL

BACKGROUND OF THE INVENTION

1. Field of the Invention

This invention relates generally to saws for cutting concrete surfaces. More particularly, the present invention relates to powered, green concrete cutting saws that are used for crack control. Known prior art concrete cutting saws are classified in United States Patent Class 125, Subclasses 13.01 and 14.

2. Description of the Prior Art

It has long been recognized that to reduce cracks in concrete surfaces adequate control joints must be provided. Without numerous joints concrete slabs will crack like glass relatively soon after the onset of hydration and shrinkage. As the concrete surface continues to cure, it expands and contracts depending upon numerous variables. Virtually from the moment of pouring the contractor is under time pressure to begin "crack control." Control joints may be established in a variety of ways, but sawing is a preferred method. By establishing a plurality of longitudinal and/or transverse cuts, plastic concrete may be properly stress relieved so that unwanted surface fractures and cracks are minimized.

After pouring, and prior to cutting, plastic concrete is surface finished by appropriate power tools. Pavers, comprising one or more elongated, rotating tubes that traverse the span of plastic concrete, are commonly used with large pours in highway construction for surfacing immediately after pouring. Typically they are used out of doors. A smaller concrete job like a driveway might require only a floating finish with a light broom texture. Riding trowels, equipped with revolving blades or plans, are suitable for fine finishing plastic concrete on large floor jobs soon after pouring. As the freshly poured concrete "sets," it soon becomes hard enough to support the weight of specialized finishing trowels. While it is still "green" (i.e., within one to several hours after pouring depending upon the concrete mixture involved), power trowel pan finishing is recommended. Soon after panning, trowelling with power blades may begin as the slab adequately hardens. Numerous concrete finishing machines are known in the art. Proper and timely finishing insures that desired surface characteristics including smoothness and flatness are achieved.

Properly placed cuts in the concrete, usually about 0.75 to 2.5 inches deep, function contraction joints to reduce cracking. In effect, the contractor prevents the formation of visible concrete cracks by the sawing process, so the outer surface will be appear as unmarred as possible. It takes a rather large and heavy machine to cut hardened concrete. So-called "green" concrete that is just beginning to cure cannot support the weight of heavy machines (and the human operator) without surface marring and degradation. Further, typical machines require expensive diamond blades that must be lubricated during operation and routinely replaced. Although they work acceptably with rock-hard concrete mixes, when encountering green concrete the rotating blade may chip exposed, outer edges of the relief cuts, disfiguring the surface finish and appearance. To reduce spalling effects from conventional water lubricated saws, it is not uncommon to wait until the evening after pouring or the next day before stress cutting begins. Unfortunately, cracking may already have started by this time. Even if visible cracks have not yet formed, conventional rotary blade saws for cutting hardened concrete have several disadvantages. Typically they are big and expensive, and they require that the contractor return to the job site at a later time.

Consequently, various methods and devices for initiating crack control as soon as possible after pouring have evolved. These contemplate the surface cutting of green concrete. U.S. Pat. Nos. 4,769,201, 4,889,675, 4,928,662, 4,938,201, 5,056,499, and 5,086,750 are exemplary. These references broadly teach the sawing of relatively green concrete with lightweight, powered carriages that support a motor and an abrasive cutting blade. To reduce groove degradation with wet concrete, the blade is rotated to "up-cut" the groove. Further, edge regions of the cut made on opposite sides of the blade are directly contacted and temporarily reinforced by structure associated with the wheeled carriage. For example, the last mentioned patents disclose a slotted skid plate penetrated at least in part by the rotating saw blade. The skid plate distributes force to prevent surface penetration. It slides along the concrete and lends structural support, pressing down on the concrete immediately adjacent the groove edges to stabilize them during cutting. In an alternative design discussed in said references, a portion of the cutting blade proximate the stress relief cut is sandwiched between adjacent segments of a slotted roller wheel. The roller wheel segments press down upon opposite edges of the groove like the skid plate discussed previously. The slot is penetrated in part by the blade and generally aligned with the cut.

U.S. Pat. No. 3,663,060 discloses a wheeled saw ideal for extremely long cuts in hardened concrete. It discloses a wheeled carriage having a pivoted blade controlled by a remote handle. The blade is centered over the frame. The latter device is best employed upon large slabs that have substantially cured, like airport runways or the like.

U.S. Pat. Nos. 2,673,725, 2,700,256, 3,357,745, and 4,840,431 disclose large conventional saws disposed upon wheeled carriages. Blade control is effectuated by various diverse means of tilting the blade arbor and shaft.

Related prior art saws especially adapted for cutting green concrete were manufactured previously in small quantities by Allen Engineering Corporation, the instant assignee, under its former model numbers GM-150 and GM-400. Similar saw structure was first publicly disclosed in January of 1993. These designs feature a wheeled carriage comprising a partially encircling frame that pivots a captivated subframe. The motor and blade system mount upon the tiltable subframe for remote control by a rearwardly extending handle. Roller supports haphazardly extend exteriorly of the frame. A cooperating guide roller system includes slots penetrated by at least a portion of the up-cutting blade. Opposite, aligned segments of the guide roller contact the relief channel edges to resist spalling or cut deformation. Because of wheel positioning and unbalanced frame dynamics, the aforementioned saws are somewhat unstable. In operation, workers develop a habit of "fighting" these saws. Operator tendency is to overcorrect saw movement, which tends to vacillate about the desired straight cutting path. Stated another way, when pointed in a given direction by an operator determined to make a straight cut, these prior saws tend to migrate about the intended path in response to blade vibration, thus failing to make the best cut possible.

My new saw solves the aforementioned problems relating to instability. Unlike any known prior art green concrete cutting saw, it operates "squarely" with a minimum of corrective effort on the part of the operator. In other words, it is desirable to provide a green concrete cutting saw of the character described that cuts in a straight line without marring the surface finish, notwithstanding the significant vibration that ordinarily misdirects less capable wheeled cutting saws.

SUMMARY OF THE INVENTION

My invention comprises a highly stable, lightweight power saw for cutting green concrete that squarely attacks the desired cutting line and dependably moves straight, even when the blade vigorously impacts loose aggregate or the like.

The preferred saw comprises a highly stable, wheeled carriage manually controlled by a suitable handle. The preferred, generally C-shaped frame comprises rigid, preferably aluminum weldment that resists twisting and deformation. The weldment substantially encircles a rigid subframe that is pivotally secured to it. The deflectable subframe mounts the gasoline motor that powers the blade, which projects laterally away from an open area of the frame. The subframe naturally accommodates blade deflections generated in response, for example, to impact with irregular aggregates.

The up-cutting rotary blade is protectively shrouded within a pivoted guard supporting a forwardly projecting roller wheel. The guard is preferably rotatably biased to urge its roller wheel at all times into contact with the concrete surface. The roller wheel helps support and stabilize the carriage, deflecting naturally in response to obstacle impacts and blade vibrations. Carriage stability is further enhanced by a bridge aligned generally in the same plane as that occupied by the revolving blade. The bridge extends between closed portions of the frame, but above the blade assembly.

A handle is pivotally attached to the frame to facilitate manual control of the carriage. Control means extending from the handle to the subframe can vary blade depth and control cutting. To minimize contact with loose aggregates and the like, a resilient scraper is mounted beneath the frame in front of each wheeled axle. The scraper brushes the surface of the concrete and directs loose aggregates or material dislodged during sawing away from carriage underside. This provides a smooth surface upon which the carriage roller wheels may steadily travel.

Thus a fundamental object of my invention is provide a highly stable power saw that dependably and non-destructively cuts green concrete.

A basic object is to provide a saw for enhancing the crack control program that modern concrete flatwork contractors must initiate for acceptable quality control.

A similar object is to aid in the establishment of a crack control program that can be safely initiated on green concrete immediately after surface finishing.

Another fundamental object is to avoid spalling or surface disfigurement.

Another important object is to make it easier for workers to cut straight grooves in the concrete surface being treated.

Another object is to provide a saw of the character described that "squarely" moves along a straight line during concrete cutting.

Another fundamental object is to provide a relatively lightweight concrete cutting saw that will be nondestructively supported upon the surface of green concrete.

Another basic object is to provide a reliable saw for making concrete control joints.

A similar object is to provide a saw of the character described with an extremely stable platform that supports the cutting blade and motor drive apparatus.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and are to be construed in conjunction therewith, and in which like reference numerals have been employed throughout in the various views wherever possible.

DETAILED DESCRIPTION

With attention directed initially to FIGS. 1–4 of the accompanying drawings, reference numeral 20 denotes the best mode of my new concrete cutting saw. The saw is moved over a concrete surface 22 for cutting relief grooves or cuts for crack control. A rigid, wheeled carriage is generally designated by the reference numeral 24. As will be described later, carriage 24 is supported by suitable rollers at its front and rear. The carriage supports a motor assembly 30 that powers rotary cutting blade 32. A handle assembly 34 projects rearwardly from the carriage for operator control of the saw.

Figure 6:
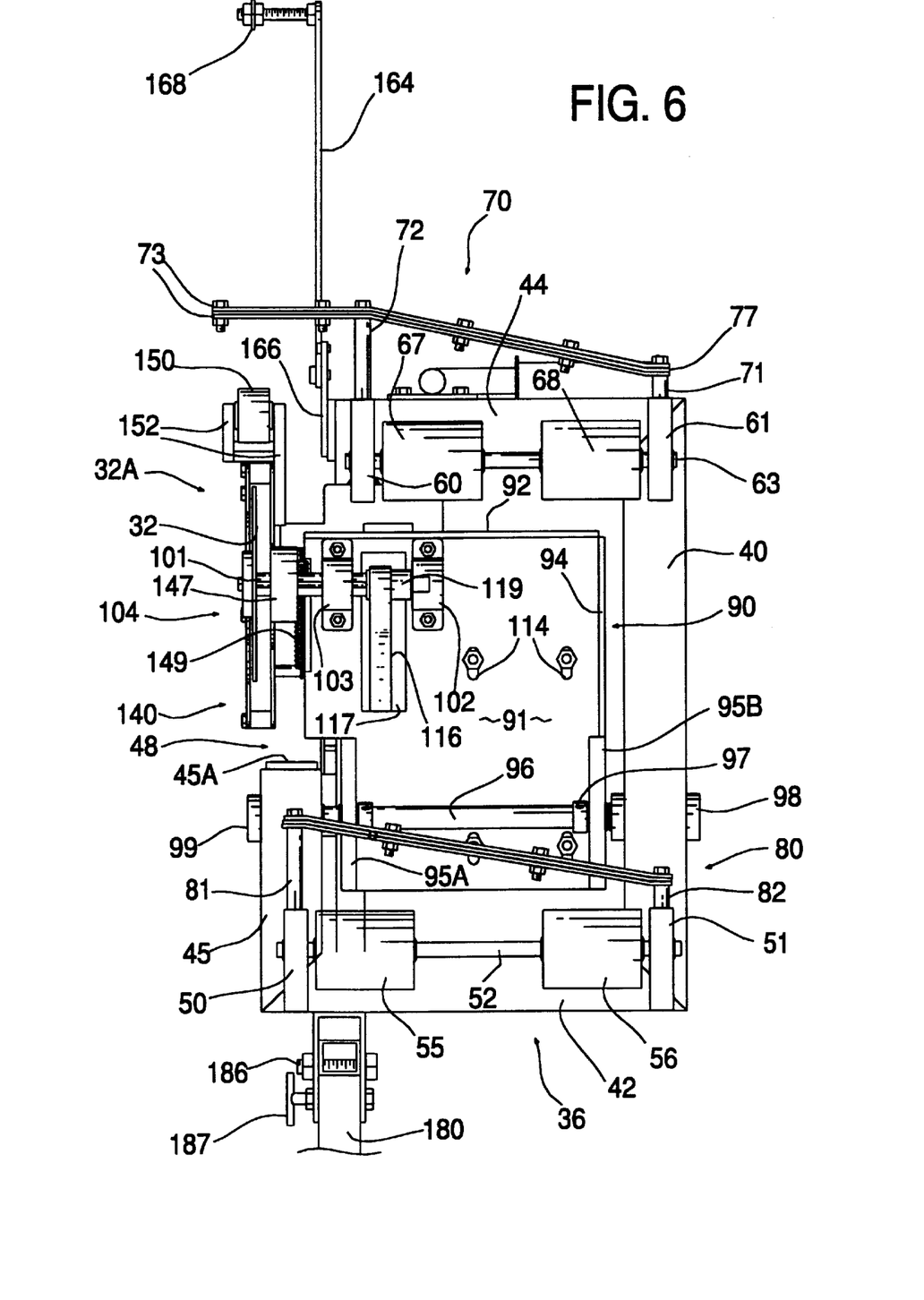
FIG. 6 is an enlarged bottom plan view of the saw.
Figure 7:
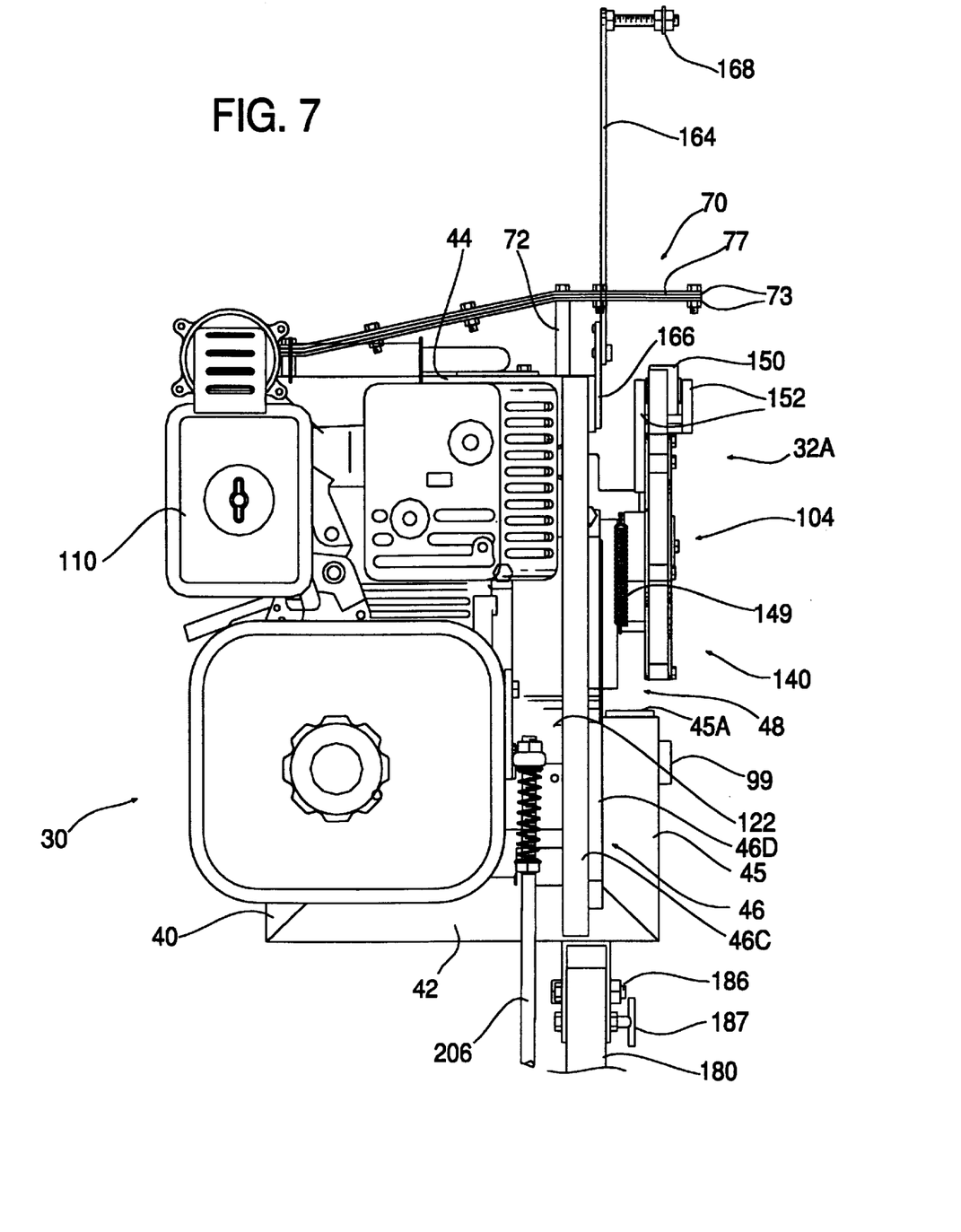
FIG. 7 is an enlarged top plan view of the saw.

With additional reference directed to FIG. 6, the carriage 24 preferably comprises a generally C-shaped frame 36 comprising a rigid, metal weldment formed of intersecting channel metal pieces. The preferably aluminum frame 36 comprises a rigid left side 40 integral with a rear 42 from which the handle assembly 34 projects. The frame front portion 44 is shorter than rear frame piece 42. Its end 44B (FIG. 1) thus terminates short of the blade assembly 32A. Rear frame piece 42 terminates in a short, right side portion 45 that projects forwardly towards blade assembly 32A.

Preferably a reinforcing bridge 46 at the right side of the frame connects the frame rear member 42 and frame front member 44. Legs 46A and 46B project vertically upwardly, and they are connected by horizontal span 46C. Preferably the bridge is generally coplanar with the handle assembly 34. Angular reinforcement 46D (FIG. 3) strengthens the frame against twisting. The plane occupied by the bridge legs 46A and 46B and span 46C is parallel with and offset from the plane defined by the revolving blade.

An "open" frame region 47 for blade assembly clearance is generally defined between frame portion ends 44B and 45A (FIG. 6). The frame surrounds an inner region generally designated by the reference numeral 48 (FIG. 6) in which the subframe to be discussed in detail hereinafter is mounted.

The carriage is supported by a pair of lower, downwardly projecting roller assemblies. The rear roller assembly comprises rigid tabs 50 and 51 that project perpendicularly downwardly from the frame. Each tab is inwardly offset slightly from the outermost edges of the frame. Tabs 50 and 51 are line bored to journal a rear axle 52 that captivates rear rollers 55 and 56. The front wheel assembly comprises tabs 60 and 61, also projecting downwardly from the frame. These mount all elongated axle 63 (FIG. 6) that captivates front rollers 67 and 68. Front rollers 67 and 68 are closer together than the opposite pair of rollers 55, 56. Each of the resilient and generally cylindrical rollers is rotatably mounted to the respective axle with a suitable roller bearing.

Preferably a pair of scraper assemblies helps stabilize the carriage. Each scraper assembly projects downwardly from the underside of the carriage into contact with the lower surface to brush away dust and debris from cutting. This ensures that a flat and smooth operating path will be preserved for carriage travel, making it easier to maintain the blade angle relative to the concrete at ninety degrees. Front scraper assembly 70 is secured to suitable mounting studs 71, 72 (FIG. 6) respectively projecting forwardly from tabs 61, 60 previously discussed. A pair of elongated frame members 73 sandwich the resilient, planar blade 77 that brushes the concrete surface. The rear scraper assembly 80 is secured beneath the frame to studs 81 and 82 respectively projecting from tabs 50 and 51 discussed earlier. Both scraper assemblies are angled as seen in FIG. 6 to direct aggregate and other loose materials out from beneath the frame to the left of the carriage.

A rigid subframe 90 is disposed within open region 47 surrounded by the frame weldment. The subframe comprises a generally rectangular plate 91 bounded by suitable bent reinforcement flanges 92, 94 (FIG. 6). A pair of parallel, spaced apart walls 95A, 95B (FIG. 6) project downwardly from the reduced width rear portion of the subframe plate 91. A rigid axle 96 pivotally mounts the subframe to the carriage. Axle 96 penetrates subframe walls 95A, 95B and is journalled therethrough with suitable bearings 97, terminating in bearings 98, 99 in frame side portions 40, 45. The blade assembly axle 101 is parallel with axle 96 and spaced forwardly therefrom. Axle 101 is mounted by pillow blocks 102, 103 and terminates in outer arbor 104 for mounting the removable cutting blade 32.

Figure 5:
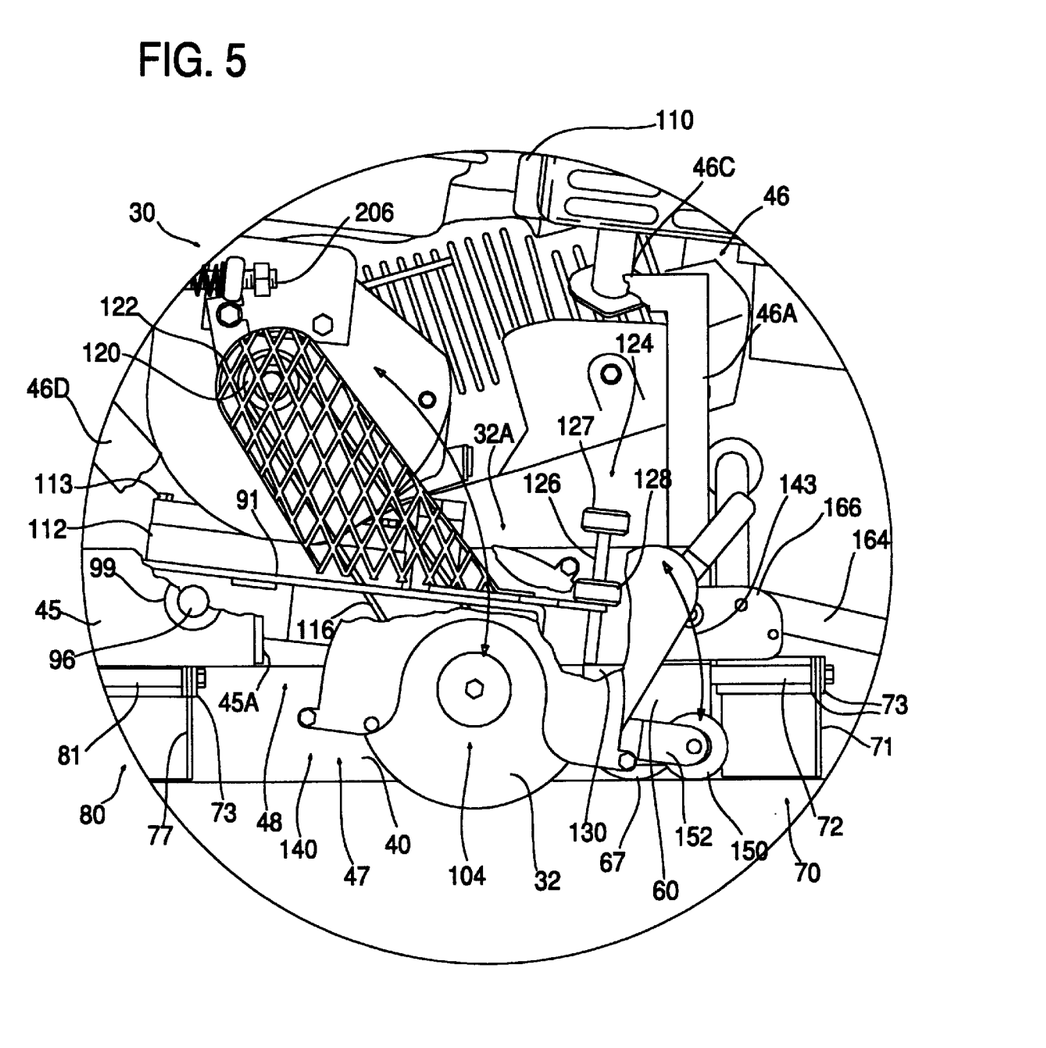
FIG. 5 is an enlarged view of circled portion 5 in FIG. 4.

The motor assembly 30 is mounted on top of the subframe. A conventional internal combustion motor 110 (FIG. 5) is mounted on top of rails 112 secured by bolts 113. These bolts penetrate the subframe slots 114 (FIG. 6) that enable the motor to be adjusted in position to tighten the drive belt 116 (FIG. 5). Belt 116 penetrates a suitable hole 117 in the subframe and is entrained about a pulley 119 splined to axle 101 (FIG. 6) between pillow blocks 102, 103 at the underside of the subframe. Motor 110 powers the main drive pulley 120 that is protectively shrouded by guard 122 (FIG. 5). Preferably the cutting blade 32 is approximately seven inches in diameter. In the best mode known at this time rotation speed is approximately 3800 RPM.

As both the motor and blade assemblies are borne by the subframe, movement of the latter does not affect belt tension. Pivotal displacement of the subframe is limited by travel limiting assembly 124 (FIG. 5). The latter assembly comprises an elongated threaded rod 126 that may contact stop 130 in the frame. The rod is rotatably adjusted by handle 127 and secured against rotation by threaded lock 128. The assembly is adjusted to establish the desired cutting depth, preferably two inches.

Figure 1:
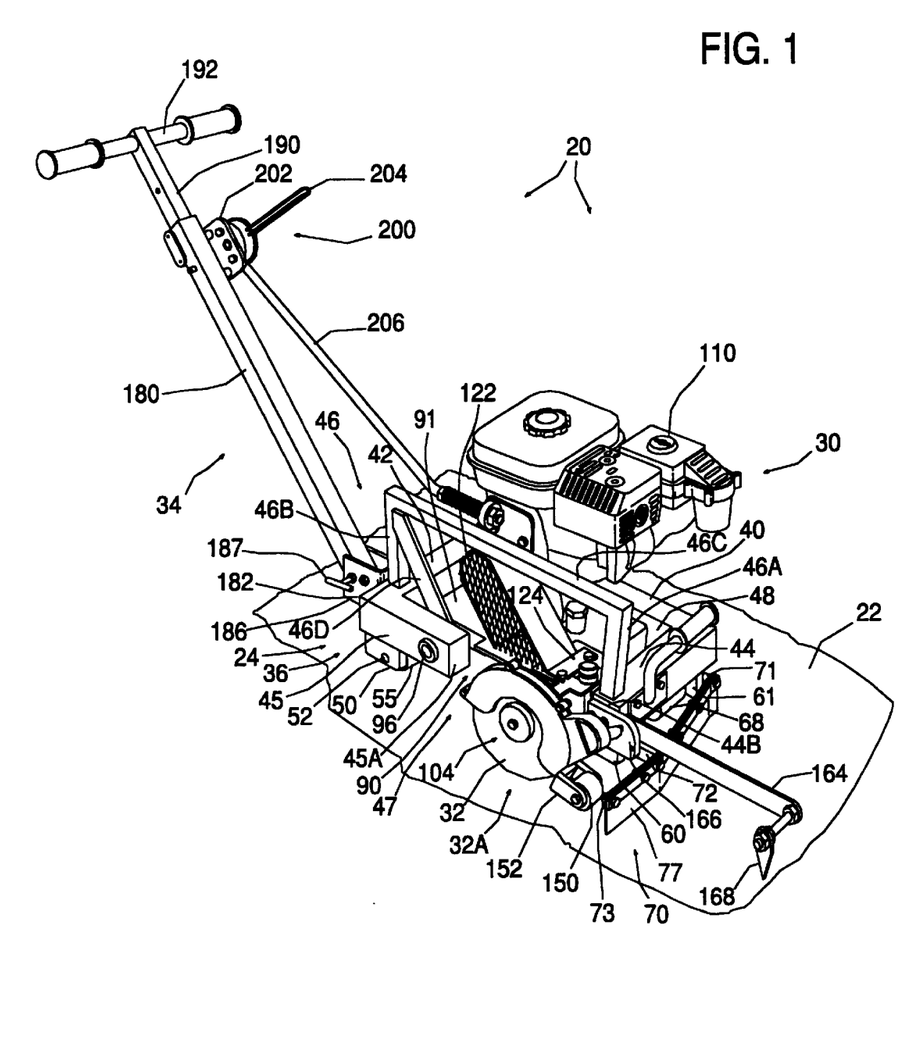
FIG. 1 is a right front perspective view of my new saw, showing the best mode known at this time.
Figure 2:
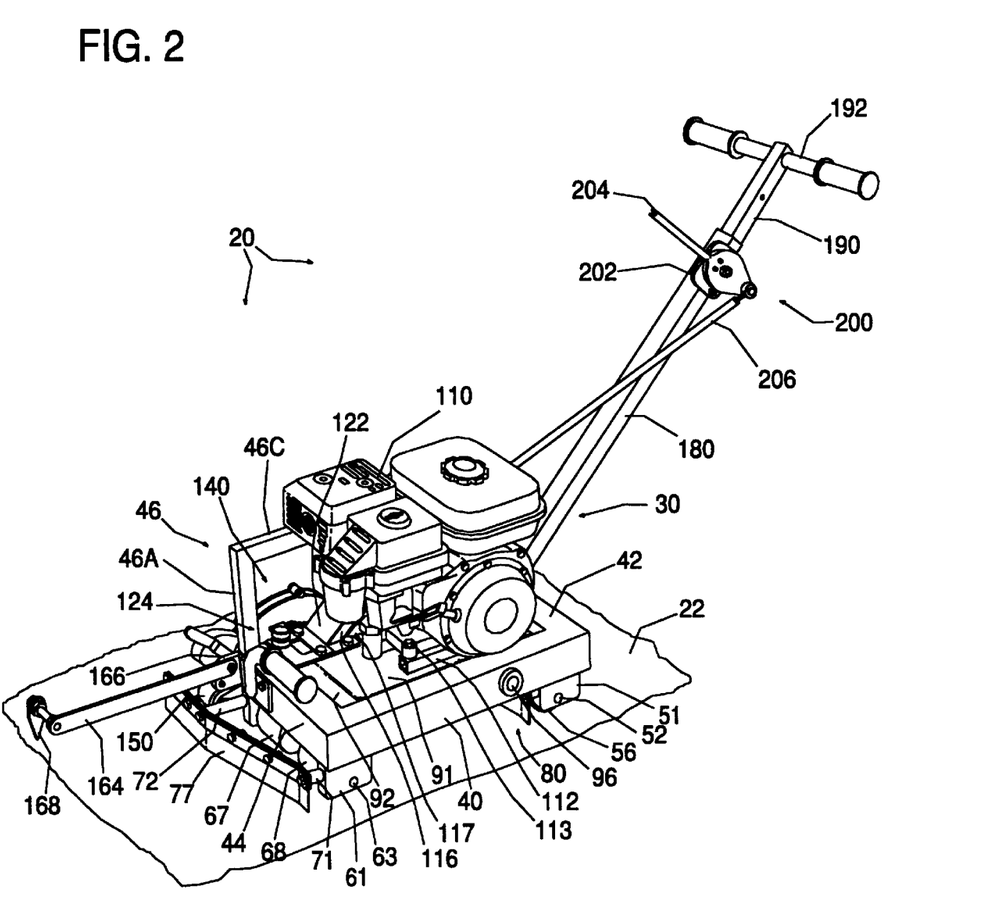
FIG. 2 is a left front perspective view of the preferred embodiment.
Figure 3:
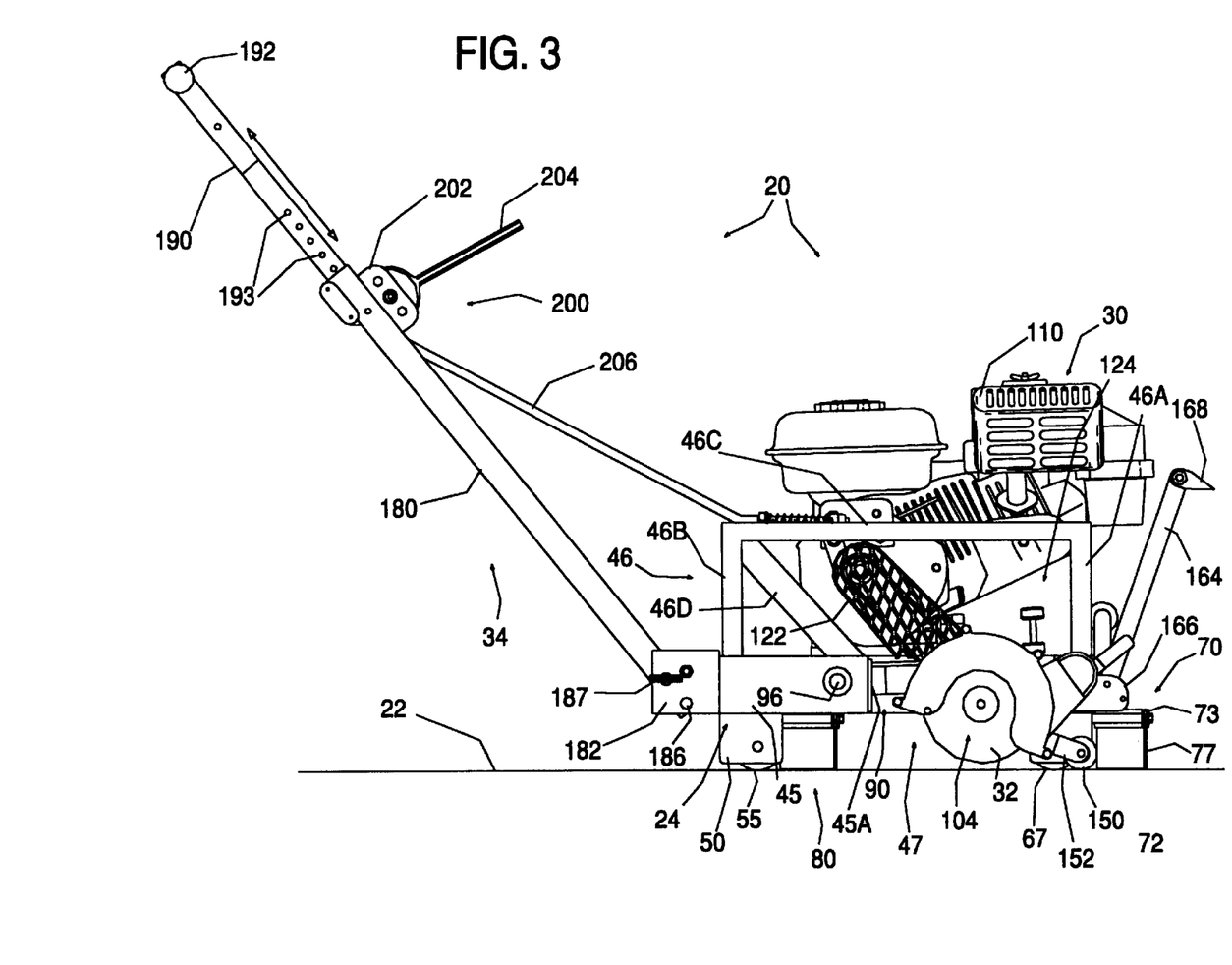
FIG. 3 is an enlarged right side elevational view thereof.
Figure 4:
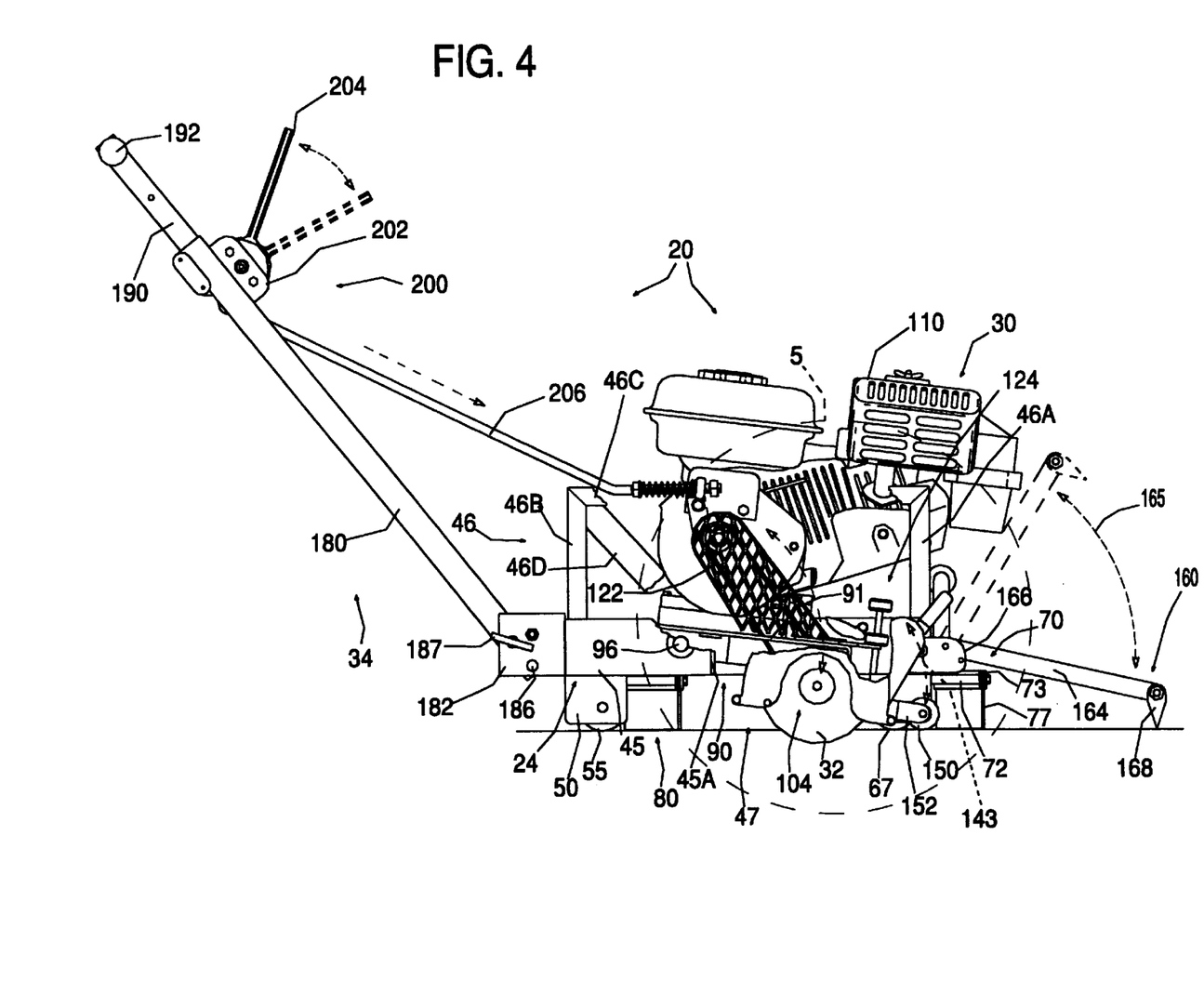
FIG. 4 is an enlarged right side elevational view similar to FIG. 3, but showing the saw blade deployed for cutting, and with moved positions illustrated in dashed lines.

The cutting blade 32 is shrouded by a guard 140. The guard comprises a generally inverted U-shaped cover that protectively surmounts the blade top. The guard is rotatably mounted to axle 101 for movement through a limited arc 143 (FIG. 4) by a bearing 147 (FIG. 6). A spring 149 biases the shroud clockwise (as viewed in FIG. 4) so that the forwardly projecting guard roller wheel 150 remains firmly urged against the concrete surface being cut. This guard wheel is journaled for rotation between a pair of projecting flanges 152 (FIG. 6) secured to the forwardmost end of the guard 140. Wheel 150 is essentially aligned with a forwardly mounted, deflectable pointer 168, which is aimed at the intended path of travel. Usually a suitable chalk line will be marked upon the concrete surface prior to cutting to guide the saw operator. Arm 164 is swiveled to flange 166 (FIGS. 4, 5) and leads to an adjustable pointer 168 that follows the chalk line. Pointer 160 can move as indicated by arc 165 (FIG. 4).

The saw is manually controlled with the handle assembly 34. The lower arm portion 180 is pivoted to a flange bracket 182 (FIGS. 3, 6) by a fastener 186. Lock 187 may ensure preservation of a given angle. The lower arm 180 telescoping receives an upper arm portion 190 that supports a transverse handle 192. Orifices 193 enable pinning of the handle elements for a user selected length.

The handle supports a control mechanism 200 comprising a bracket 202 that mounts a blade pitch control lever 204. An elongated control link 206 extends from the bottom of the lever to the motor assembly 30 for pivoting the motor and thus the subframe. A throttle lever (not shown) selects motor speed with a cable comprising part of link 206. As pivoting occurs, blade cutting depth can be adjusted.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A powered saw for cutting relief grooves for crack control in concrete, said saw comprising:

a stabilized carriage comprising a generally C-shaped frame formed from a rigid metal weldment and comprising a closed side, a closed front, a closed rear and an opposite frame side that is partially open wherein the carriage comprises:
    a first pair of rigid, inwardly offset tabs projecting downwardly from the frame front;
    a first axle extending between said first pair of tabs;
    a first pair of resilient, cylindrical rollers on said first axle;
    a second pair of rigid, inwardly offset tabs projecting downwardly from the frame rear;
    a second axle extending between said second pair of tabs; and,
    a second pair of resilient cylindrical rollers on said second axle;
  a handle coupled to the carriage;
  an elevated bridge that connects the front and rear of the frame for closing the partially open side;
  a rigid, subframe pivotally mounted to said frame and surrounded by said closed side, closed front, and partially open frame side;
  control means extending to the subframe for tilting it to vary cutting depth;

a drive motor mounted on said subframe;

a blade assembly secured to said subframe and driven by said motor, the blade assembly comprising an arbor projecting from the partially open frame side for removably mounting a selected rotary blade; and at least one scraper assembly projecting downwardly to the concrete from beneath the carriage to deflect away loose aggregate.

2. The saw as defined in claim 1 wherein each scraper assembly is angled and projects downwardly to the concrete in front of each pair of rollers to deflect away loose materials dislodged during cutting, aggregates, debris and the like.

3. The saw as defined in claim 2 wherein the blade is shrouded by a pivotally displaceable guard that mounts a forwardly projecting roller wheel.

4. The saw as defined in claim 3 further comprising means for normally firmly biasing the guard roller wheel against the concrete surface.

5. A powered saw for cutting relief grooves for crack control in concrete said saw comprising:

a carriage comprising a front, a rear, a closed side, a partially open side, a first pair of tabs projecting downwardly from said front, a first axle extending between said first pair of tabs, a first pair of resilient cylindrical rollers on said first axle, a second pair of tabs projecting downwardly from said rear, a second axle extending between said second pair of tabs, and a second pair of resilient cylindrical rollers on said second axle;

a handle coupled to the carriage;

an elevated bridge for closing the partially open side of the carriage;

a rigid, subframe pivotally mounted within the carriage;

control means extending to the subframe for tilting it to vary cutting depth;

a drive motor mounted on said subframe;

a cutting driven by said motor; and, resilient scraper means projecting downwardly to the concrete from beneath the carriage for preserving a flat and smooth path of travel for the carriage and its rollers.

6. The saw as defined in claim 5 wherein said scraper means comprises an angled scraper projecting downwardly to the concrete in front of each pair of rollers to deflect away loose debris.

7. The saw as defined in claim 6 wherein the blade is shrouded by a pivotally displaceable guard that mounts a forwardly projecting roller wheel.

8. The saw as defined in claim 7 further comprising means for normally firmly biasing the guard roller wheel against the concrete surface.

9. A powered saw for cutting concrete, said saw comprising:

a rigid frame comprising a closed front, a closed rear, a closed side, and an opposite, partially open side;

elevated bridge means extending across and above the open side of said frame for reinforcing the saw to prevent twisting;

first resilient cylindrical roller wheel means beneath the frame rear and second resilient cylindrical roller wheel means beneath the frame front for supporting the saw upon concrete, wherein said first and second roller wheel means are all contained beneath the frame between the frame sides;

a control handle coupled to said frame for enabling an operator to activate and control the saw;

a rigid, generally rectangular subframe pivotally mounted to said frame and bounded by said front, said rear, and said closed and open sides;

motor means for powering said saw, said motor means mounted upon said subframe;

a drive axle journaled to said subframe and driven by said motor means, said axle terminating in an arbor projecting towards said open side for removably supporting a blade for cutting concrete;

pivotable blade guard means for shrouding the blade;

guard roller means contacting the concrete surface for adjusting the height of the blade guard means;

control means extending from said handle to said subframe for tilting the subframe relative to the frame to modify cutting parameters;

at least one scraper assembly projecting downwardly to the concrete from beneath the carriage to deflect away loose aggregate; and, means for limiting pivoting of said subframe relative to said main frame.

10. The saw as defined in claim 9 wherein said elevated bridge means occupies a plane that is parallel to the plane occupied by said blade.

11. A powered saw for cutting relief grooves in concrete, said saw comprising:

a stabilized carriage comprising a generally C-shaped frame formed from a rigid metal weldment and comprising a closed side, a closed front, a closed rear and an opposite frame side that is partially open;

a handle coupled to the carriage;

an elevated bridge that connects the front and rear of the frame for closing the partially open side; first and second axles beneath the frame;

resilient cylindrical rollers on each of said first and second axles;

a rigid, subframe pivotally mounted to said frame and surrounded by said closed side, closed front, and partially open frame side;

control means extending to the subframe for tilting it to vary cutting depth;

a drive motor mounted on said subframe;

a blade assembly secured to said subframe and driven by said motor, the blade assembly comprising an arbor projecting from the partially open frame side for removably mounting a selected rotary blade; and, at least one scraper assembly projecting downwardly to the concrete from beneath the carriage to deflect away loose aggregate.

* * * * *